United States Patent [19]
Hellerich

[11] 3,778,949
[45] Dec. 18, 1973

[54] REINFORCED STRUCTURAL ELEMENT
[75] Inventor: Walter Hellerich, Heilbronn, Germany
[73] Assignee: Arbed S.A. Arbed-Felten & Guilleaume Vereinigte Drahtwerke, Cologne, Germany
[22] Filed: May 20, 1971
[21] Appl. No.: 145,200

[30] Foreign Application Priority Data
May 20, 1970 Germany.................. P 20 24 453.5

[52] U.S. Cl.................. 52/309, 52/652, 52/664, 161/46, 161/160, 161/168, 161/172
[51] Int. Cl............................ B32b 5/00, E04c 1/00
[58] Field of Search.................. 161/53, 55, 57, 58, 161/60, 47, 109, 110, 111, 112, 113, 130, 137, 159, 160, 46, 69, 172, 175, 168; 52/309, 630, 720, 721, 652, 664

[56] References Cited
UNITED STATES PATENTS
1,657,979   1/1928   Thomas................................ 161/53
3,172,072   3/1965   Willy................................. 161/159 X
1,606,680   11/1926  Wisner................................. 161/53
2,933,919   4/1960   Rueshoff........................... 161/55 X
2,742,391   4/1956   Warp............................... 161/115 X
2,763,586   9/1956   Noyes.............................. 161/137 X
2,820,228   1/1958   Rodman............................. 52/630 X
3,270,103   8/1966   Kurtz............................... 52/309 X
3,309,827   3/1967   Nicosia............................. 52/309 X
3,338,017   8/1967   Ernst............................... 52/309 X
3,562,985   2/1971   Nicosia............................. 52/309 X
3,579,937   5/1971   Lukens................................. 52/309

Primary Examiner—George F. Lesmes
Assistant Examiner—Lorraine T. Kendell
Attorney—Michael S. Striker

[57] ABSTRACT

A body of synthetic plastic material has an exposed surface and reinforcing means in form of one or more layers of wires which are embedded in the body. Anchoring means in form of wire sections extend from the region of the exposed surface to the reinforcing means and are connected therewith.

3 Claims, 6 Drawing Figures

PATENTED DEC 18 1973　　　　　　　　　　　　　3,778,949

INVENTOR.
WALTER HELLERICH
BY  M. Lou S. Stecker
     AHorney

REINFORCED STRUCTURAL ELEMENT

BACKGROUND OF THE INVENTION

The present invention relates generally to structural elements, and more particularly to reinforced structural elements.

It is already known to make reinforced structural elements, particularly those which are subjected to bending stresses, of synthetic plastic material with reinforcing elements embedded therein. The reinforcing elements may be of metal, of glass fiber or the like. Such elements have the advantage of being light in weight and relatively strong. They do, however, also have the disadvantage that when subjected to strong bending stresses breakage of such a structural element frequently begins with the reinforcing components becoming separated from their anchorage in the synthetic plastic material of the structural element, bending and then breaking. This has been observed particularly in circumstances where the synthetic plastic used for the structural element itself has a relatively low modulus of elasticity with respect to that of the reinforcing component, for instance where the synthetic plastic material of the structural element is one of the frequently used polyurethane foam plastics.

SUMMARY OF THE INVENTION

It is, therefore, a general object of the present invention to overcome the disadvantages of the prior art.

More particularly it is an object of the present invention to provide an improved structural element which is not possessed of these disadvantages.

Still more particularly it is an object of the present invention to provide an improved reinforced structural element whose bending resistance is increased in that the anchoring of the reinforcing components in the material of the structural element is improved.

In pursuance of the above objects, and of others which will become apparent hereafter, one feature of the invention resides in a novel article of manufacture, namely a structural element which comprises a body having an exposed surface, reinforcing means embedded in the material of said body, and anchoring means connected with said reinforcing means and extending to the region of said exposed surface.

The material of the body of the structural element will preferably be a synthetic plastic, for instance (but not exclusively) a foam plastic. The reinforcing means will be in form of one or more layers of wires, with the anchoring means being provided either in form of discrete wire sections which are connected with the wires of the layer, or in form of wire portions projecting from the layer itself.

According to one embodiment the wires of the layer may be arranged in substantial parallelism, connected with one another, or they may be secured adhesively or otherwise on a carrier tape. The wire sections may extend normal or at an angle of inclination with reference to the general plane of the layer and they may be provided by bending out portions of the wires which make up the layer. The ends of the wires of the layer and/or of the wire sections may be configurated as hooks, as eyes or in other suitable shape which will further facilitate anchoring in the material of the body. If the wire sections are discrete elements which are connected with the wires of the layer, then they may be in form of brackets which embrace portions of the wires constituting the layer of reinforcing members, and if the wires constituting this layer are elongated it is advantageous to improve the anchorage by having the wire sections be offset relative to one another in longitudinal direction of the wires making up the layer. The wires of the layer and the wire sections may also be coated with a bonding agent which facilitates bonding with the surrounding material of the body, for instance a synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1b is a horizontal section through FIG. 1a;

FIG. 2b is a top-plan view of FIG. 2a;

FIG. 3b is a top-plan view of FIG. 3a.

DESCRIPTION OF THE PREFERRED EMBODIMENTS

Figure 1A:
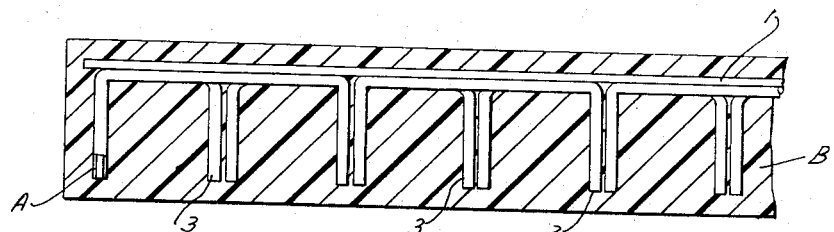
FIG. 1a is a fragmentary side-elevational section through a structural element according to one embodiment of the invention.
Figure 1B:
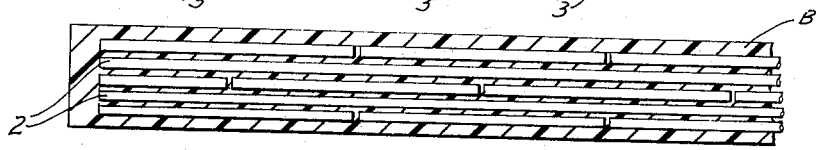

Discussing now the drawing in detail, and firstly the embodiment in FIGS. 1a and 1b, it will be seen that what I have here illustrated is a reinforced structural element in form of a rod of synthetic plastic material, for instance polyurethane foam material, which is reinforced by an insert in form of a layer of substantially U-shaped wire brackets 3. Adjacent ones of the wire brackets 3 are arranged offset with reference to one another as is evident from FIG. 1b, and wire reinforcing elements 2 are located between the layers of wire brackets 3, extending longitudinally of the material of the body or rod B. The brackets 3 and the additional elements in form of wires 2 are secured, in this instance adhesively, to a carrier tape 1 which may for instance consist of glass fiber material or silver. The wires 2 and 3 are also provided with a coating (fragmentarily shown) A which is a bonding agent facilitating bonding with the material of the body B and which further adheres them to one another. It is, of course, the legs of the brackets 3 which here constitute the reinforcing means extending towards an exposed surface of the structure element.

Figure 2A:
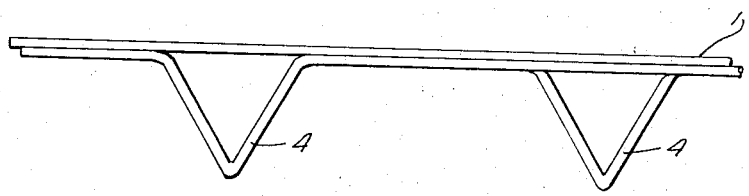
FIG. 2a is a side-elevational view of a reinforcing and anchoring component according to another embodiment of the invention.
Figure 2B:
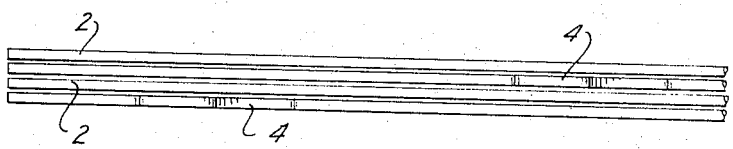

In FIGS. 2a and 2b I have omitted the material of the body B and have illustrated only the reinforcing and anchoring means. In this embodiment the reinforcing means or insert is in form of metallic wires 2 and bent metallic wires 4. As before, the wires 2 are reinforcing components and the wires 4 correspond to the brackets 3 of FIGS. 1a and 1b and constitute and anchoring means. Again, the locations where adjacent ones of the wires 4 are deformed are offset relative to one another in order to distribute the anchoring portions as widely as possible throughout the material of the body B (not shown) which is to be reinforced. All wires are again provided with a coating (not shown) of adhesive or bonding agent.

Figure 3A:
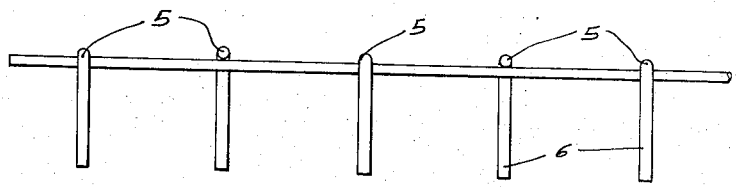
FIG. 3a is a view similar to FIG. 2a but illustrating a further reinforcing component.
Figure 3B:
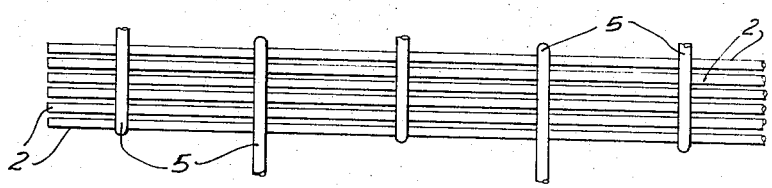

In FIGS. 3a and 3b, finally, I have illustrated another reinforcing and anchoring insert composed of longitudinal metal wires 2 which constitute the reinforcing component, and substantially L-shaped anchoring wires or sections 5 which constitute the anchoring means or component. The wires 2 and 5 are adhesively secured to one another by a bonding layer or coating (not shown) of a synthetic plastic resin which connects them together and also facilitates their adherence to the surrounding material (not shown) of the body B. In this embodiment the tape 1 has been omitted.

I wish it to be understood that the term "wire" as employed herein refers to elements which may in conventional manner be composed of metallic material, but also to other wire-like elements which may be composed of a different material, for instance glass fiber wires, plastic wires or the like.

In all embodiments the reinforcing wires or sections extend to the region of at least one exposed surface of the body B, as is shown in FIG. 1a.

Resort to the present invention results in the provision of a reinforced structural element in which the strength of the reinforcing means, especially of metallic reinforcing means, is more advantageously utilized in synthetic plastic structural elements than was heretofore the case. This, in turn, of course makes it possible to construct the structural elements with smaller dimensions than heretofore (because of their greater strength) and/or to produce them at lesser expense while simultaneously obtaining greater reliability and strength against extreme stresses. Merely parenthetically it is pointed out that although the invention has been discussed on hand of a body B to be reinforced, which is of synthetic plastic material including, but not exclusively, a foam material, the invention is applicable also to structural elements of different materials, for instance of concrete or the like.

Of course, it goes without saying that the invention is applicable irrespective of the shape of the structural element which may, for instance, be rod-shaped, bar-shaped, plate or panel-shaped, or the like.

It will be understood that each of the elements described above, or two or more together, may also find a useful application in other types of applications differing from the types described above.

While the invention has been illustrated and described as embodied in a reinforced structural element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. As a novel article of manufacture, a structural element comprising a body of synthetic plastic material having a first and a spaced opposite second surface; a layer composed of a plurality of rows of U-shaped wire reinforcing brackets embedded in said body and each having a straight portion located inwardly adjacent said first surface, and bent-out anchoring portions extending from and integral with said straight portion, said straight portions extending in parallel but being transversely spaced and said anchoring portions having respective tips which are located inwardly adjacent said second surface and are mutually unconnected, the brackets in adjacent rows being staggered longitudinally of said rows; reinforcing wires embedded in said body and extending intermediate said rows in parallelism with the respective straight portions; and a carrier tape embedded in said body inwardly of said first surface and being bonded to said straight portions and said reinforcing wires.

2. As a novel article of manufacture, a structural element comprising a body of synthetic plastic material having a first and a spaced opposite second surface; a layer composed of a plurality of rows of wire reinforcing brackets embedded in said body and each having straight portions located inwardly adjacent said first surface, and substantially V-shaped bent-out anchoring portions extending from and integral with said straight portions, said straight portions in the respective rows extending in parallel but being transversely spaced and said anchoring portions having respective tips which are located inwardly adjacent said second surface and are mutually unconnected, the brackets in adjacent rows being staggered longitudinally of said rows; reinforcing wires embedded in said body and extending intermediate said rows in parallelism with the respective straight portions; and a carrier tape embedded in said body inwardly of said first surface and being bonded to said straight portions and said reinforcing wires.

3. As a novel article of manufacture, a structural element comprising a body of synthetic plastic material having a first and a spaced opposite second surface; a layer of parallel reinforcing wires embedded in said body inwardly adjacent said first surface; and a plurality of L-shaped wire reinforcing brackets also embedded in said body, said reinforcing brackets each having one portion extending transversely of the elongation of said wires intermediate said first surface and said wires and being connected with the latter, and another portion integral with and extending substantially normal to said one portion, said other portions having respective tips which are located inwardly adjacent said second surface and are mutually unconnected.

* * * * *